W. A. RIDER.
TRACTOR.
APPLICATION FILED JAN. 13, 1914.

1,208,657.

Patented Dec. 12, 1916.
3 SHEETS—SHEET 1.

Fig. 1.

Witnesses:

Inventor:
William A. Rider

W. A. RIDER.
TRACTOR.
APPLICATION FILED JAN. 13, 1914.
1,208,657.
Patented Dec. 12, 1916.
3 SHEETS—SHEET 2.
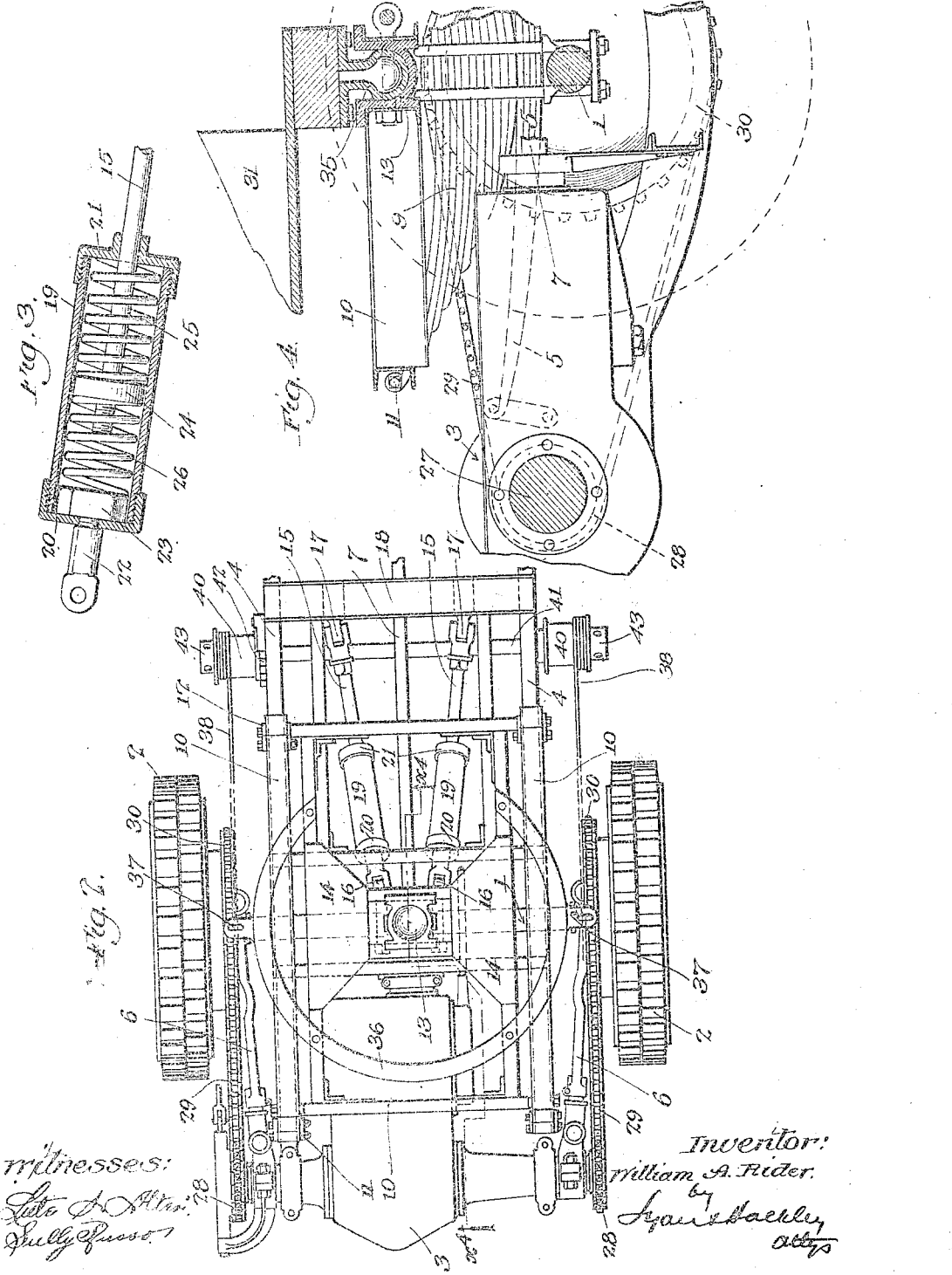

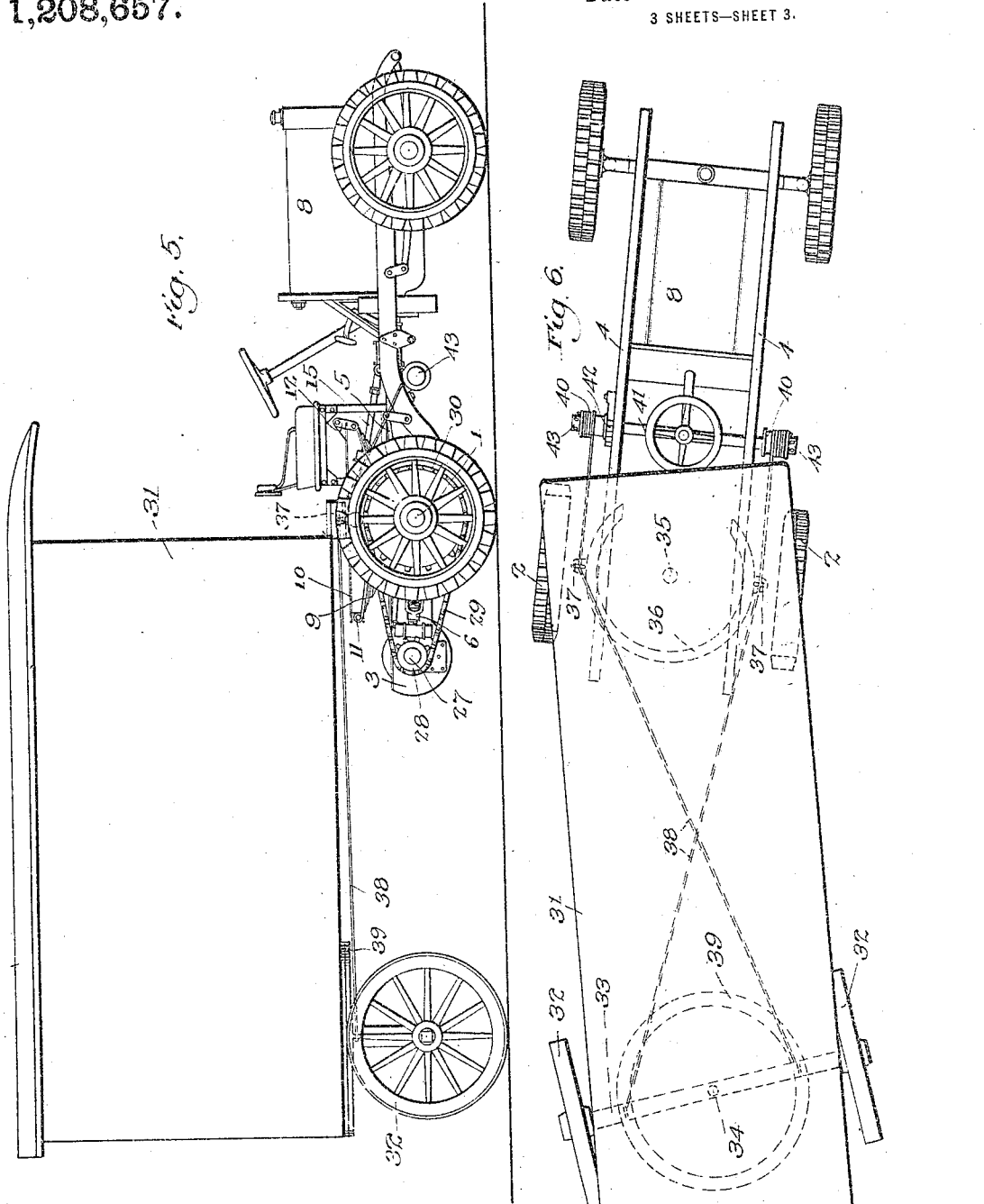

UNITED STATES PATENT OFFICE.

WILLIAM A. RIDER, OF LOS ANGELES, CALIFORNIA, ASSIGNOR TO M. S. BULKLEY, OF LOS ANGELES, CALIFORNIA.

TRACTOR 1,208,657.      Specification of Letters Patent.      Patented Dec. 12, 1916.

Application filed January 13, 1914. Serial No. 811,803.

*To all whom it may concern:*

Be it known that I, WILLIAM A. RIDER, a citizen of the United States, residing at Los Angeles, in the county of Los Angeles and State of California, have invented a new and useful Tractor, of which the following is a specification.

This invention relates to a tractor adapted for a variety of uses, and among the objects of the invention, are to provide a short wheel base, thereby securing a minimum turning radius to support the frame of the tractor by a set of springs, which only have that particular duty to perform, and to support the load carried by means of another set of springs.

Another object is to provide a supporting means located directly over the rear axle of the tractor for supporting and drawing a trailer, and to provide radius rods extending from the said supporting means to the frame of the tractor, and constructed with shock absorbers.

Another object is to locate a jack shaft at the rear of the rear axle, and provide suitable gearing extending forward from the jack shaft to the rear wheels for driving the same, together with means extending rearwardly from the motor to the jack shaft for driving the latter.

A further object is to provide a cable means for steering the rear wheels of the trailer controlled by the movements of the tractor, and to provide means for taking up slack in the said cable, enabling the bolsters of the trailer to be set at various distances from the tractor to accommodate the length of the load.

Other objects and advantages will be brought out in the following description.

Referring to the drawings: Figure 1 is a side elevation of the tractor. Fig. 2 is a plan view of the rear portion of the tractor. Fig. 3 is a longitudinal section through a shock absorber. Fig. 4 is an enlarged section on line $x^4$—$x^4$, Fig. 2. Fig. 5 is a side elevation of the tractor showing a trailer mounted thereon. Fig. 6 is a plan view of the tractor and trailer, showing the angular movement of the rear wheels of the trailer.

1 designates the rear axle of the tractor, upon which are mounted the driving wheels 2.

3 designates a casing containing the differential gearing, and is located at the rear of the rear axle 1, being supported on the rear ends of the side frame bars 4. The rear end of the frame 4 is supported by a pair of springs 5, which are in turn supported on shaft 1. A pair of radius rods 6 have their front ends mounted on a shaft 1, and extend rearwardly to the ends of the casing 3. The propeller shaft 7 extends forward from the differential gear casing 3 to the engine, which is located within the hood 8.

Mounted above the springs 5 are springs 9, which support a load carrying frame 10, the rear ends of springs 9 being pivotally connected at 11 to the frame, and the front ends being pivotally connected to pivoted hangers 12, the latter permitting the necessary elongation of the spring 9 when the frame 10 moves down. A socket 13 is supported directly over the axle 1, and in the center of frame 10 by a bridge 14, and draw bars 15 extend forward from the eyes 16 on the bridge 14 to eyes 17 on the cross bar 18 of the main frame 4, and each draw bar 15 is longitudinally extensible and provided with a barrel 19 with caps 20 and 21 screwed on the ends thereof. A forked eye 22 is secured thereto by a nut 23. The draw bar 15 extends slidably through the cap 21, and has a follower 24 screwed on its end inside the barrel 19. Compression springs 25 and 26 are arranged within the barrels on each side of the follower 24 and act to cushion the movement of the follower 24 and attached draw bar 15 in both directions.

The differential gearing located within the casing 3 has a jack shaft 27 which carries sprockets 28, which are connected by chains 29 with sprockets 30 on the driving wheels 2 for driving the latter. By thus locating the jack shaft 27 at the rear of the rear axle, I am enabled to move the rear axle and wheels forward and comparatively close to the front wheels so that a short turning radius is secured.

Figs. 5 and 6 show the manner of carrying a trailer in which 31 designates the body of the trailer provided with rear wheels 32, which are mounted on an axle 33 pivoted at 34. The front end of the body 31, as clearly shown in Fig. 4, has a depending hemispherical boss 35, which seats in the socket 13, and affords a universal movement.

Secured to the frame 10 is a segment 36 having eyes 37 at each side thereof, and extending through the eyes 37 are cables 38, the rear ends of which extend rearwardly under the body of the trailer 31, and are attached to the fifth wheel 39 of the trailer. The cables 38 from the eyes 37 extend forwardly and are wound on reels 40 on shaft 41 having a ratchet 42. The capstan heads 43 enable the shaft 41 to be turned to take up slack in the cable. This enables the bolster of the trailer to be located at various distances from the tractor to suit the length of the load. The cables, as clearly shown in Fig. 6, cross each other under the body of the trailer 31, and their purpose is to turn the rear shaft 33 in the opposite direction to that in which the tractor turns with relation to the trailer, and to cause the same relative angular movement for the purpose of reducing the radius of circle required to turn in. This is highly important in drawing a trailer.

By reference to Figs. 1 and 4, it will be seen that the weight of the trailer is carried entirely by the springs 9, thereby relieving the springs 5 from any duty in carrying other than the weight of the frame 4 and the regular equipment of the tractor. This is an important and valuable feature, as it enables the springs 9 to be made sufficiently stiff to carry the required load and permits the springs 5 to be made light. If the same springs 5 were required to carry the load of the trailer, they would have to be so stiff that they would be practically of no effect in cushioning the regular frame and equipment of the tractor when it was operated without the trailer.

What I claim is:

1. In a tractor, a rear axle, driving wheels thereon, a tractor frame, resilient means mounted on said axle supporting said tractor frame, a jack shaft located at the rear of the rear axle, suitable gearing between the jack shaft and rear wheels for driving the latter, means for driving said jack shaft, resilient means mounted on said rear axle independent of said first named resilient means, a load supporting frame mounted on said second named resilient means, and a draw bar secured to said tractor frame and to said load supporting frame.

2. In a tractor, a rear axle, driving wheels thereon, a tractor frame, resilient means mounted on said axle supporting said frame, a jack shaft located at the rear of the rear axle, suitable gearing between the jack shaft and the rear axles for driving the latter, means for driving the jack shaft, radius rods with their front ends pivoted on the rear axle and their rear ends pivotally connected with the jack shaft, resilient means mounted on said axle independent of said first named resilient means, a load supporting frame mounted on said second named resilient means, and a draw bar secured to said tractor frame and to said load supporting frame.

3. In a tractor, a rear axle, driving wheels thereon, a jack shaft located at the rear of the rear axle, suitable gearing between the jack shaft and rear wheels for driving the latter, a propeller shaft extending from a point forward of the rear wheels to the jack shaft for driving the latter, radius rods with their front ends pivoted on the rear axle and their rear ends pivotally connected with the jack shaft, front wheels, an axle for the front wheels, side frame members with their forward ends supported by the front axle, said side frame members extending rearwardly and below the rear axle, the rear ends of the side frame members supporting the said jack shaft.

4. In a tractor, a rear axle, driving wheels thereon, a jack shaft located at the rear of the rear axle provided with a housing, suitable gearing between the jack shaft and rear wheels for driving the latter, a propeller shaft extending from a point forward of the rear wheels to the jack shaft for driving the latter, radius rods with their front ends pivoted on the rear axle and their rear ends pivotally connected with the jack shaft, front wheels, an axle for the front wheels, side frame members with their forward ends supported by the front axle, said side frame members extending rearwardly and below the rear axle, the rear ends of the side frame members supporting the jack shaft housing, and springs supported by the said rear axle, the front end of said springs being connected with intermediate points of said side frame members, the rear ends of said springs being connected at the rear ends of the frame members.

5. In a tractor frame, a rear axle, a tractor frame provided with side bars, resilient means mounted on said axle supporting said tractor frame, a jack shaft located at the rear of said rear axle and supported by said side bars, suitable gearing between said jack shaft and rear wheels for driving the latter, a second resilient means mounted on the rear axle, a load supporting frame mounted on said second resilient means, and a draw bar secured to the tractor frame and to the load supporting frame.

6. In a tractor, a rear axle, side frame members extending rearwardly and forwardly of said rear axle, said side frame members passing below the rear axle, springs supported by the rear axle, said springs being connected to the side frame members to support the latter, springs supported by the rear axle and a frame supported by the latter springs, said latter springs and frame being adapted for supporting the load independently of the first mentioned springs, and draw bars with their rear ends in connection with said latter frame and extending forward and having connection at their forward ends with said first mentioned frame, and shock absorbers in said draw bars.

7. In a tractor, a rear axle, side frame members extending rearwardly and forwardly of said rear axle, said side frame members passing below the rear axle, springs supported by the rear axle, said springs being connected to the side frame members to support the latter, springs supported by the rear axle and a frame supported by the latter springs, said latter springs and frame being adapted for supporting the load independently of the first mentioned springs, a bridge on said latter frame, a socket formed in said bridge, a trailer, said trailer having a stud engaging in said socket, draw bars connecting said bridge and said frame members, and shock absorbers in said draw bars.

8. In a tractor, a rear axle, drive wheels on said rear axle, a jack shaft, means to secure said jack shaft rearwardly of the rear axle, side frame members extending rearwardly below the rear axle supporting the jack shaft, a frame, resilient means for supporting the frame above the rear axle, and longitudinally yieldable draw bars connected with the frame and side frame members.

9. In a tractor, a rear axle, side frame members extending rearwardly and forwardly of said rear axle, said side frame members passing below the rear axle near their rear ends and located above the rear axle from a point near their center to their forward ends, resilient means supported on the rear axle and connected with the side frame members on opposite sides of said rear axle, a resilient supported frame supported on and above the rear axle, and yieldable draw bars pivotally connected with the frame and side frame members.

In testimony whereof, I have hereunto set my hand at Los Angeles, California, this 6th day of December, 1913.

WILLIAM A. RIDER.

In presence of—
G. T. HACKLEY,
LORRAINE E. DURROW.